US012663021B1

(12) United States Patent
Lighty et al.

(10) Patent No.: US 12,663,021 B1
(45) Date of Patent: Jun. 23, 2026

(54) COMPRESSOR BLEED AIR EXHAUST DUCTING FOR GAS TURBINE ENGINE SYSTEMS

(71) Applicants: Rolls-Royce North American Technologies Inc., Indianapolis, IN (US); Rolls-Royce Corporation, Indianapolis, IN (US)

(72) Inventors: Kerry J. Lighty, Indianapolis, IN (US); Eric Gooderham, Indianapolis, IN (US); Michael Kamel, Indianapolis, IN (US); Matthew Koeske, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 19/090,309

(22) Filed: Mar. 25, 2025

(51) Int. Cl.
| | |
|---|---|
| *F04D 29/54* | (2006.01) |
| *F02C 9/18* | (2006.01) |
| *F04D 27/02* | (2006.01) |
| *F04D 29/08* | (2006.01) |

(52) U.S. Cl.
CPC .............. *F04D 29/545* (2013.01); *F02C 9/18* (2013.01); *F04D 27/0207* (2013.01); *F04D 29/083* (2013.01)

(58) Field of Classification Search
CPC .... F04D 29/083; F04D 29/545; F04D 27/009; F04D 27/0207; F04D 27/0215; F02C 9/18
See application file for complete search history.

(56) References Cited

U.S. PATENT DOCUMENTS

| | | | |
|---|---|---|---|
| 3,597,106 | A | 8/1971 | Anderson |
| 3,777,489 | A | 12/1973 | George et al. |
| 4,844,689 | A | 7/1989 | Seed |
| 5,160,241 | A | 11/1992 | Glynn |
| 5,351,478 | A | 10/1994 | Walker et al. |
| 6,216,438 | B1 | 4/2001 | Aschenbruck et al. |
| 6,325,595 | B1 | 12/2001 | Breeze-Stringfellow et al. |
| 6,622,475 | B2 | 9/2003 | Brault et al. |

(Continued)

FOREIGN PATENT DOCUMENTS

| | | |
|---|---|---|
| CA | 2938237 A1 | 2/2017 |
| DE | 3905900 A1 | 8/1990 |

(Continued)

*Primary Examiner* — Elton K Wong
(74) *Attorney, Agent, or Firm* — Barnes & Thornburg

(57) ABSTRACT

A gas turbine engine system includes an enclosure, a compressor assembly located at least partially within the enclosure, and a bleed-duct joint. The compressor assembly includes a compressor and a bleed-air collector having a bleed-air manifold configured to receive a portion of air compressed by the compressor and a bleed-air duct extending through an aperture in the enclosure to direct the portion of the air outside of the enclosure. The bleed-air duct includes a first pipe coupled to the compressor for movement with the compressor and a second pipe extending through the aperture in the first wall and arranged around the first pipe. The bleed-duct joint is configured to couple the bleed-air duct with the enclosure to locate the second pipe relative to the first pipe.

19 Claims, 6 Drawing Sheets

(56)  References Cited

U.S. PATENT DOCUMENTS

| | | |
|---|---|---|
| 6,783,324 B2 | 8/2004 | Muny |
| 8,695,352 B2 | 4/2014 | Bohney et al. |
| 8,893,512 B2 | 11/2014 | Donahoo et al. |
| 9,677,472 B2 | 6/2017 | Travis et al. |
| 10,227,930 B2 | 3/2019 | Saxena et al. |
| 10,612,416 B2 | 4/2020 | Hatfield |
| 10,683,802 B2 * | 6/2020 | Nithsdale ............. F04D 29/545 |
| 11,635,030 B2 | 4/2023 | Donnelly et al. |
| 2003/0223863 A1 | 12/2003 | Laurello et al. |
| 2006/0288687 A1 | 12/2006 | Bruno et al. |
| 2009/0297335 A1 | 12/2009 | Karafillis et al. |

FOREIGN PATENT DOCUMENTS

| | | | |
|---|---|---|---|
| DE | 4136408 A1 | 5/1993 |
| EP | 1136679 A2 | 9/2001 |
| EP | 3091210 B1 | 7/2018 |
| RU | 2235908 C2 | 9/2004 |
| SE | 502913 C2 | 2/1996 |
| WO | 2013192064 A1 | 12/2013 |

* cited by examiner

COMPRESSOR BLEED AIR EXHAUST DUCTING FOR GAS TURBINE ENGINE SYSTEMS

STATEMENT REGARDING FEDERALLY SPONSORED RESEARCH OR DEVELOPMENT

Embodiments of the present disclosure were made with government support under Contract No. HQ00342090012. The government may have certain rights.

FIELD OF THE DISCLOSURE

The present disclosure relates generally to gas turbine engines and more specifically to compressor bleed air systems.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

On gas turbine engines, air is sometimes bled from the compressor to prevent the engine from surging, for example, to prevent the compressor from surging. For example, bleed valves on the compressor case may be opened during engine start up or shutdown and closed during high power running. When open, the valves allow air from the compressor flow path to exit through an orifice. Typical industrial engines exhaust the hot bleed air overboard to the atmosphere, external to the compressor. In some examples, the exhausted hot bleed air may potentially raise the temperature external to the compressor to undesired levels.

SUMMARY

The present disclosure may comprise one or more of the following features and combinations thereof.

A gas turbine engine system may comprise an enclosure, a compressor assembly, and a bleed-duct joint. The enclosure may have a plurality of walls that cooperate to define a cavity within the enclosure. The plurality of walls may include a first wall formed to define an aperture therethrough.

The compressor assembly may be configured to collect compressor bleed air. The compressor assembly may include a compressor and a bleed-air manifold. The compressor may be located within the cavity and be configured to compress air received from within the enclosure. The bleed-air collector may include a bleed-air manifold and a bleed-air duct. The bleed-air manifold may be configured to receive a portion of the air compressed by the compressor. The bleed-air duct may extend through the aperture in the first wall to direct the portion of the air through the aperture formed in the first wall of the enclosure. The bleed-air duct may have a first pipe coupled to the compressor for movement with the compressor and a second pipe extending through the aperture in the first wall and arranged around the first pipe.

The bleed-duct joint may be configured to couple the bleed-air duct with the enclosure. The bleed-duct joint may be coupled with the second pipe and the first wall of the enclosure to locate the second pipe relative to the first pipe so that the first pipe is spaced apart from the second pipe to mechanically decouple the first pipe from the second pipe and allow for thermal growth of the first pipe during operation of the gas turbine engine system.

In some embodiments, the bleed-duct joint may include an attachment bracket coupled with the second pipe for movement with the second pipe. The attachment bracket may be coupled with the first wall to locate the second pipe relative to the enclosure. The attachment bracket may be formed to define a longitudinally extending slot.

In some embodiments, the first wall may be formed to define a slot perpendicular to the longitudinally extending slot. A fastener may couple the attachment bracket to the first wall. The fastener may extend between the slot in the first wall and the longitudinally extending slot in the attachment bracket, the fastener may be arranged to slide within the slot in the first wall and the longitudinally extending slot in the attachment bracket to locate the second pipe.

In some embodiments, the first wall may be formed to define a slot adjacent to the aperture. A fastener may couple the attachment bracket to the first wall arranged to extend through and slide within the slot to locate the second pipe.

In some embodiments, the bleed-duct joint may include a seal assembly configured to block fluid from entering the compressor through the aperture. The seal assembly may include a rain shield coupled to the second pipe and extending past an outer circumference of the aperture. The seal assembly may further include a seal located between the first wall and the rain shield. The rain shield may be arranged to contact the seal to block fluid from entering the bleed-duct joint from between the first wall and the rain shield. The seal assembly may include a spacer coupled with the first wall and arranged around the aperture and the second pipe to form a closed perimeter of the bleed-duct joint. The seal may be coupled to the spacer and the rain shield may be arranged to rest on top of the seal and the spacer to allow the rain shield to move relative to the first wall.

In some embodiments, the second pipe may include an outer portion disposed outside of the enclosure and an inner portion coupled to the outer portion and arranged to extend through the aperture towards the compressor. The rain shield may be disposed between the inner portion and the outer portion to couple the rain shield to the second pipe and create a seal.

In another embodiment, a gas turbine engine system may comprise an enclosure, a compressor assembly, and a bleed-duct joint. The enclosure may have a plurality of walls that cooperate to define a cavity within the enclosure. The plurality of walls may include a first wall formed to define an aperture therethrough.

The compressor assembly may be configured to collect compressor bleed air. The compressor assembly may include a compressor located within the cavity and configured to compress air received from within the enclosure and a bleed-air collector configured to receive a portion of the air compressed by the compressor and including a bleed-air duct extending through the aperture in the first wall to direct the portion of the air through the aperture formed in the first wall of the enclosure. The bleed-air duct may have a first pipe coupled to the compressor and a second pipe extending through the aperture in the first wall and arranged around the first pipe.

The bleed-duct joint may be configured to couple the bleed-air duct with the enclosure. The bleed-duct joint may be coupled with the second pipe and the first wall of the enclosure to locate the second pipe relative to the first pipe so that the first pipe is spaced apart from the second pipe to mechanically decouple the first pipe from the second pipe.

In some embodiments, the bleed-duct joint may include an attachment bracket coupled with the second pipe for movement with the second pipe. The attachment bracket may be coupled with the first wall to locate the second pipe relative to the enclosure. The attachment bracket may be formed to define a longitudinally extending slot. The first wall may be formed to define a slot perpendicular to the longitudinally extending slot. A fastener may couple the attachment bracket to the first wall. The fastener may extend between the slot in the first wall and the longitudinally extending slot in the attachment bracket.

In another embodiment, gas turbine engine system may comprise an enclosure, a compressor assembly, and a bleed-duct joint. The enclosure may have a plurality of walls that cooperate to define a cavity within the enclosure. The plurality of walls may include a first wall formed to define an aperture therethrough.

The compressor assembly may be configured to collect compressor bleed air. The compressor assembly may include a compressor located within the cavity and configured to compress air received from within the enclosure and a bleed-air collector configured to receive a portion of the air compressed by the compressor and including a bleed-air duct extending through the aperture in the first wall to direct the portion of the air through the aperture formed in the first wall of the enclosure. The bleed-air duct may have a first pipe coupled to the compressor and a second pipe extending through the aperture in the first wall and arranged around the first pipe.

The bleed-duct joint may be configured to couple the bleed-air duct with the enclosure, the bleed-duct joint coupled with the second pipe and the first wall of the enclosure.

These and other features of the present disclosure will become more apparent from the following description of the illustrative embodiments.

DETAILED DESCRIPTION OF THE DRAWINGS

Figure 1:
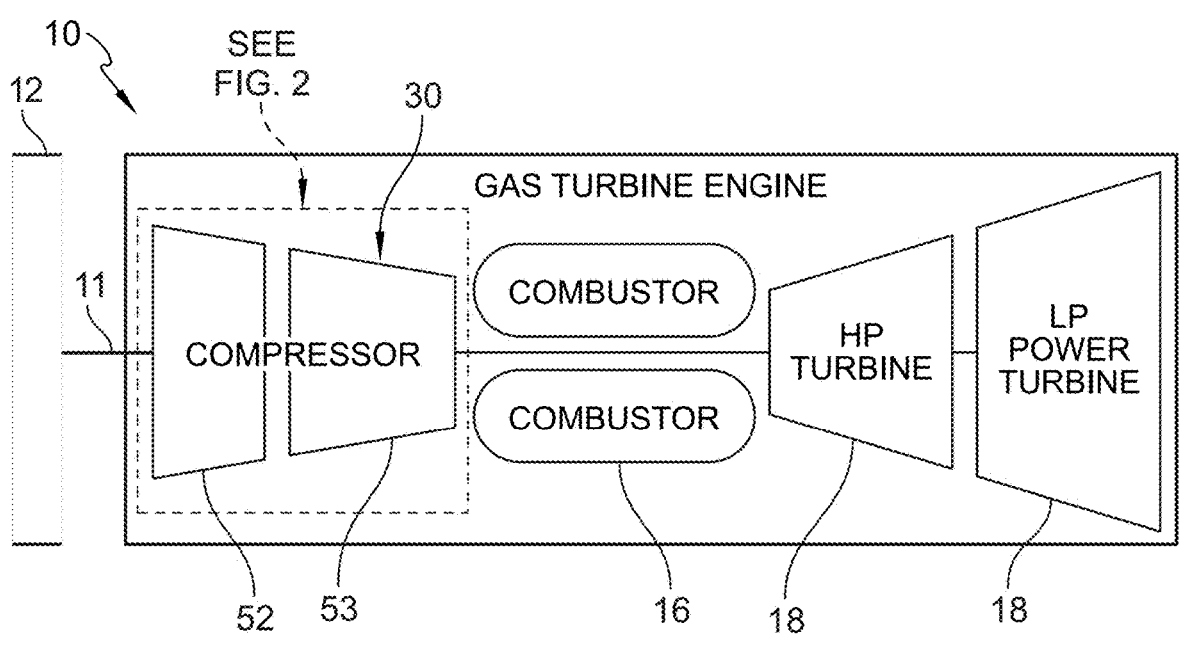
FIG. 1 is a system diagram view of a gas turbine engine system that includes a fan, a compressor assembly, a combustor, and a turbine.

For the purposes of promoting an understanding of the principles of the disclosure, reference will now be made to a number of illustrative embodiments illustrated in the drawings and specific language will be used to describe the same.

Figure 2:
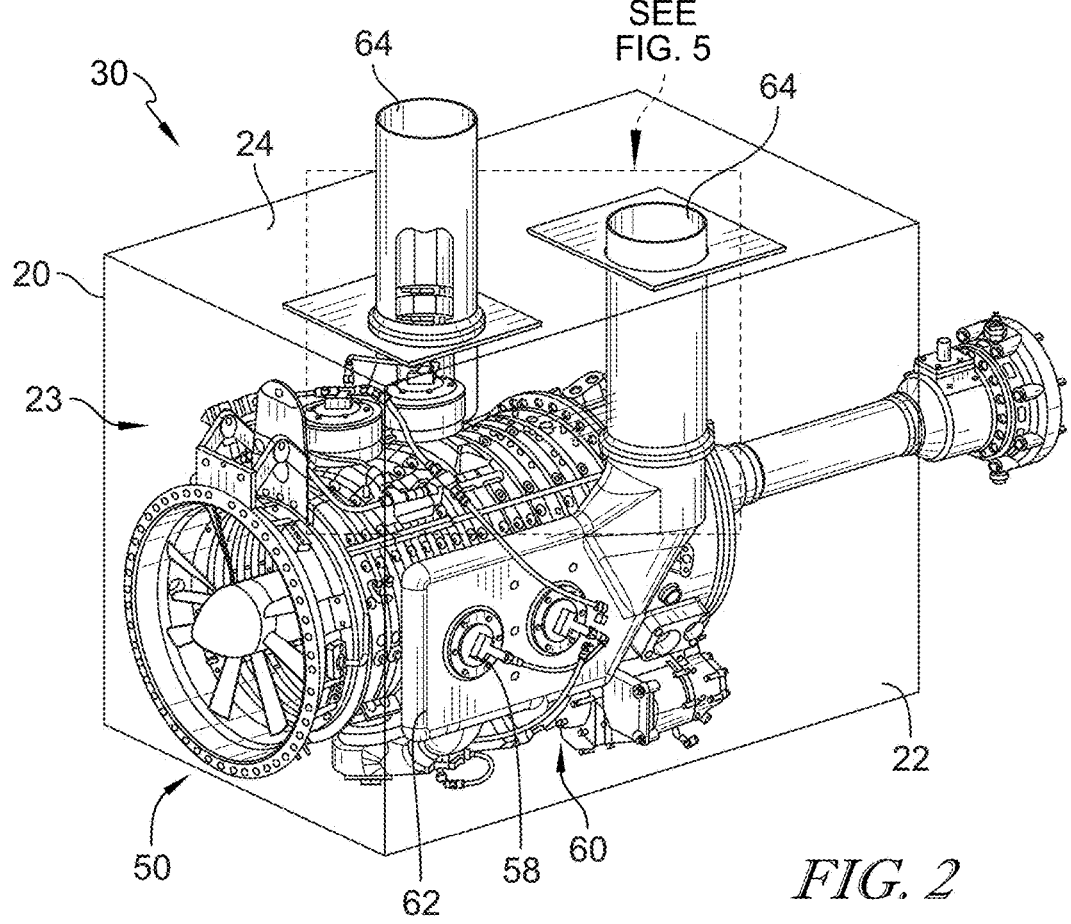
FIG. 2 is a perspective view of the a portion of the compressor assembly of the gas turbine engine system of FIG. 1, showing that at least a portion of the compressor assembly is surrounded by and coupled to an enclosure via a bleed-duct joint that allows for movement between the compressor assembly and the enclosure, and showing that the compressor assembly includes a compressor, an outer case surrounding the compressor, bleed-air valves to bleed air from the outer case of the compressor, and bleed-air collectors to collect the bleed air and direct the bleed air out of the enclosure.

As shown in FIGS. 1-2, a gas turbine engine system 10 comprises an enclosure 20, a compressor assembly 30 located at least partially within the enclosure 20, and a bleed-duct joint 40 configured to couple the compressor assembly 30 with the enclosure. In the illustrative embodiment, the compressor assembly 30 is located entirely within the enclosure 20. In other embodiments, the enclosure 20 may surround only a portion of the compressor assembly 30. As shown in FIG. 1, the compressor assembly 30 includes a compressor 50, a combustor assembly 16, and a turbine assembly 18. In some embodiments, the gas turbine engine system 10 may include a fan 12 arranged to driven by the turbine 18 and provide thrust for propelling an aircraft. The compressor 50, which is discussed in further detail below, compresses and delivers air to the combustor 16. The combustor 16 mixes fuel with the compressed air received from the compressor 50 and ignites the fuel. The hot, high pressure products of the combustion reaction in the combustor 16 are directed into the turbine 18 to cause he turbine 18 to rotate about a central axis 11 of the gas turbine engine system 10 and drive the compressor 50 and the fan 12.

5

Figure 5:
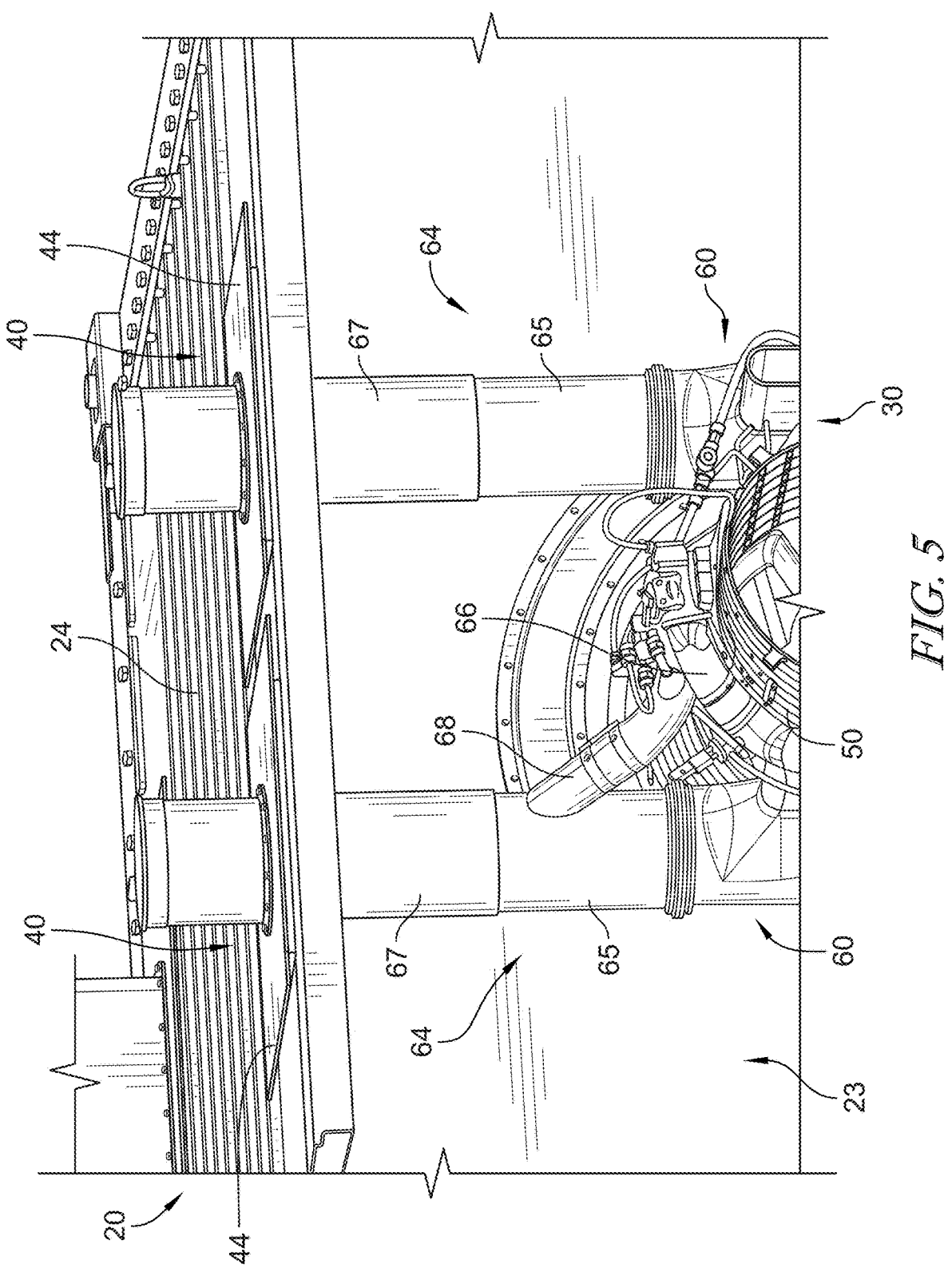
FIG. 5 is a detail view of a portion of the compressor assembly and the bleed-duct joint of FIG. 2, showing that the bleed-duct joint includes a seal assembly and the bleed-air duct includes a first pipe coupled to the compressor and a second pipe extending through the enclosure via the bleed-duct joint and arranged to fit around the first pipe.
Figure 6:
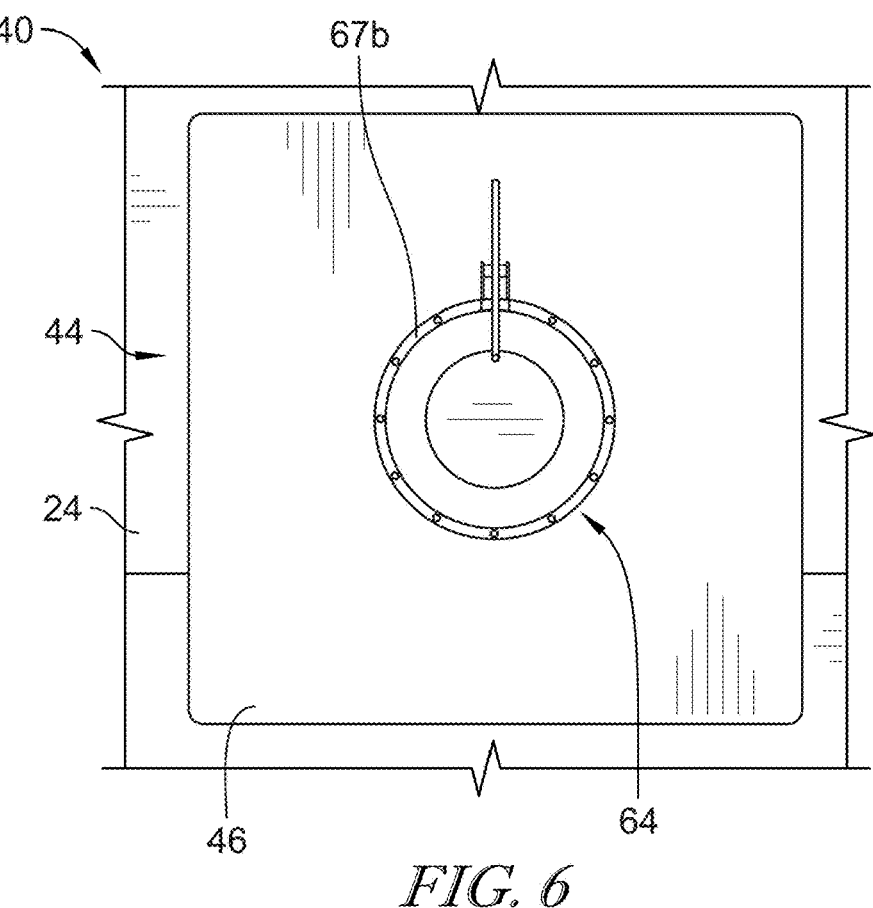
FIG. 6 is a top view of a portion of the bleed-duct joint of FIG. 2, showing the seal assembly includes a rain shield coupled to the second pipe and configured to seal the bleed-duct joint and enclosure cavity from water.

As shown in FIG. 5, the bleed-duct joint 40 may couple the compressor assembly 30 with the enclosure 20 such that the compressor assembly 30 and the enclosure 20 are able to move with respect to one another while still remaining coupled together. The arrangement of the bleed-duct joint 40 also prevents or mitigates load or stresses from being transferred between the compressor assembly 30 and the enclosure 20 by allowing a gap to set between the first pipe and the second pipe at installation.

The enclosure 20 may at least partially surround and encompass the compressor assembly 30. The enclosure 20 includes a plurality of walls 22 defining a cavity 23 within the enclosure 20. The walls 22 may be disposed around the compressor assembly 30 such that the compressor assembly is at least partially disposed within the cavity 23. At least one of the plurality of walls may be a bleed-joint wall 24, where the bleed-duct joint 40 is located. In other words, the bleed-joint wall 24 may be the wall 22 where at least a portion of a bleed air duct 64 extends through the enclosure 20.

The bleed-joint wall 24 may be shaped to form an aperture 26 and/or a slot 28. In the illustrative embodiment, the bleed-joint wall 24 forms multiple apertures 26 and multiple slots 28. As will be explained in more detail below, at least a portion of the bleed air duct 64 may extend through the aperture 26. At least a portion of the bleed-duct joint 40 may extend through the slot 28. The slot 28 may be shaped to allow movement of the bleed air duct 64 relative to the enclosure 20 along the direction of the slot 28. In some embodiments, the enclosure 20 may completely surround and contain the compressor 50 other than the aperture 26 in the bleed-joint wall 24 through which a portion of the bleed air duct 64 extends, allowing bleed air from the compressor 50 to be exhausted outside of the enclosure 20.

The compressor assembly 30 is disposed at least partially within the cavity 23 and includes the compressor 50 and a bleed-air collector 60. The bleed-air collector 60 is coupled to the compressor 50 and arranged to receive and collect bleed air bled from the compressor 50. The bleed-air collector 60 directs the bleed air out of the enclosure 20 to avoid heating the air within the enclosure to an undesirable temperature due to the higher temperature of the bleed air bled from the compressor 50.

The compressor 50 includes one or more compressor stages 52, 53, an outer case 54 spanning the length of the compressor 50 along the compressor stages 52, 53, a primary flow path 56 defined by the outer case 54, and a plurality of bleed-air valves 58 coupled with the outer case 54. The compressor stages 52, 53 may, for example include a first or low pressure stage 52 and a second or high pressure stage 53. The second stage 53 may be disposed axially downstream from the first stage 52. The first and second stages 52, 53 may be any stages in the compressor. In some embodiment, the compressor 50 may comprise more than two stages. For example, the low pressure stage 52 may be the fifth stage of the compressor 50 and the high pressure stage 53 may be the tenth stage of the compressor 50. Each stage 52, 53 may comprise a respective hub coupled to a compressor shaft, and a plurality of airfoils coupled to the hub for rotation therewith to compress air and push the air downstream to the combustor 16 or other compressor stages.

The outer case 54 is arranged circumferentially about the axis 11 of the gas turbine engine system 10. The outer case 54 may extend axially along the length of the compressor 50 from an inlet of the compressor to an outlet of the compressor, encompassing all of the compressor stages 52, 53. The outer case 54 defines a boundary of the primary flow path 56 of air as it flows through the compressor 50, for example, from the fan 12 and to the combustor 16.

Figure 3:
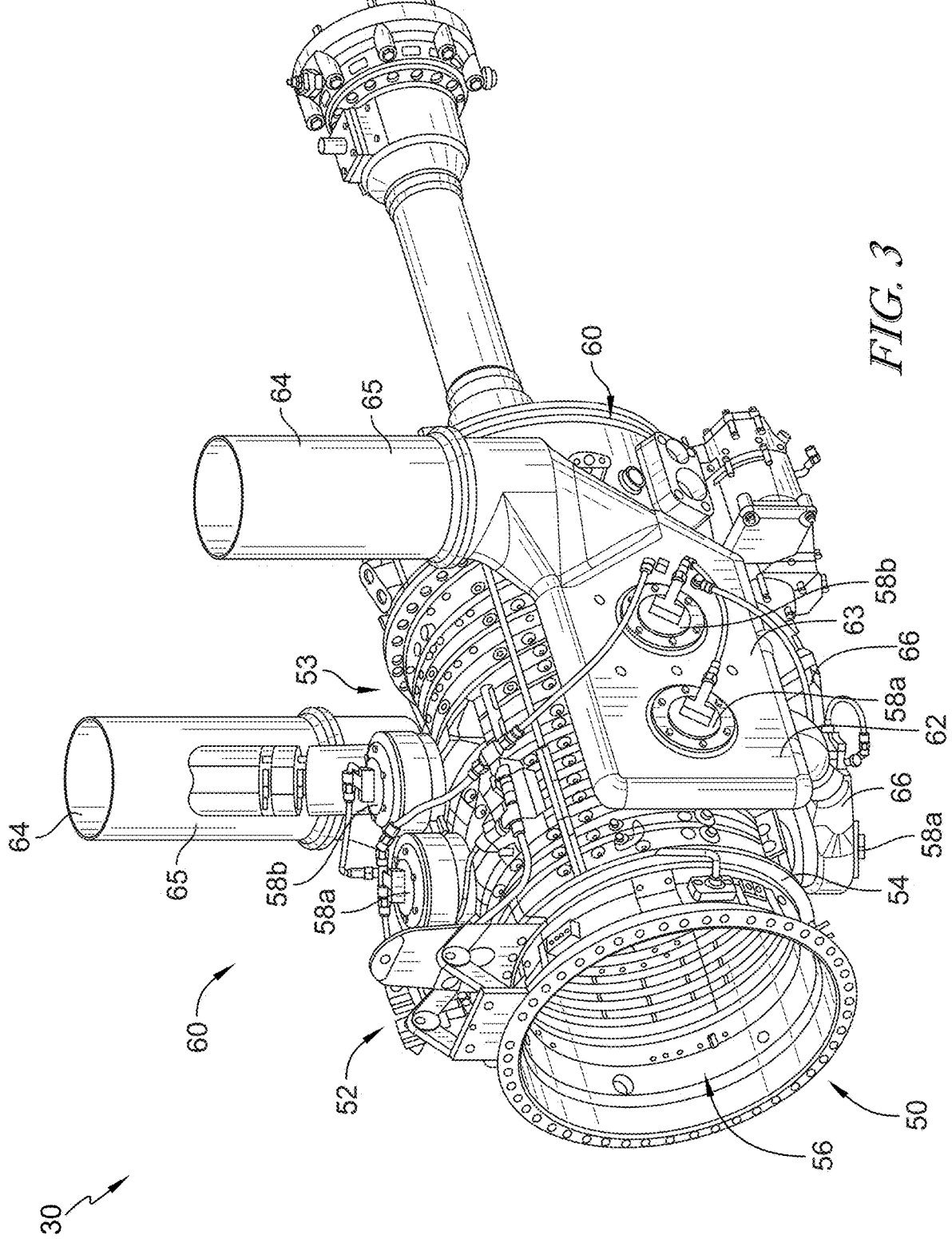
FIG. 3 is a right perspective view of the compressor assembly of FIG. 2 showing that each one of the bleed-air collectors includes a bleed-air manifold to collect air from the bleed-air valves, one or more routing ducts to route bleed air from the bleed-air valves to the bleed-air manifolds, and a bleed-air duct to direct the collect bleed air and direct it out through the enclosure.
Figure 4:
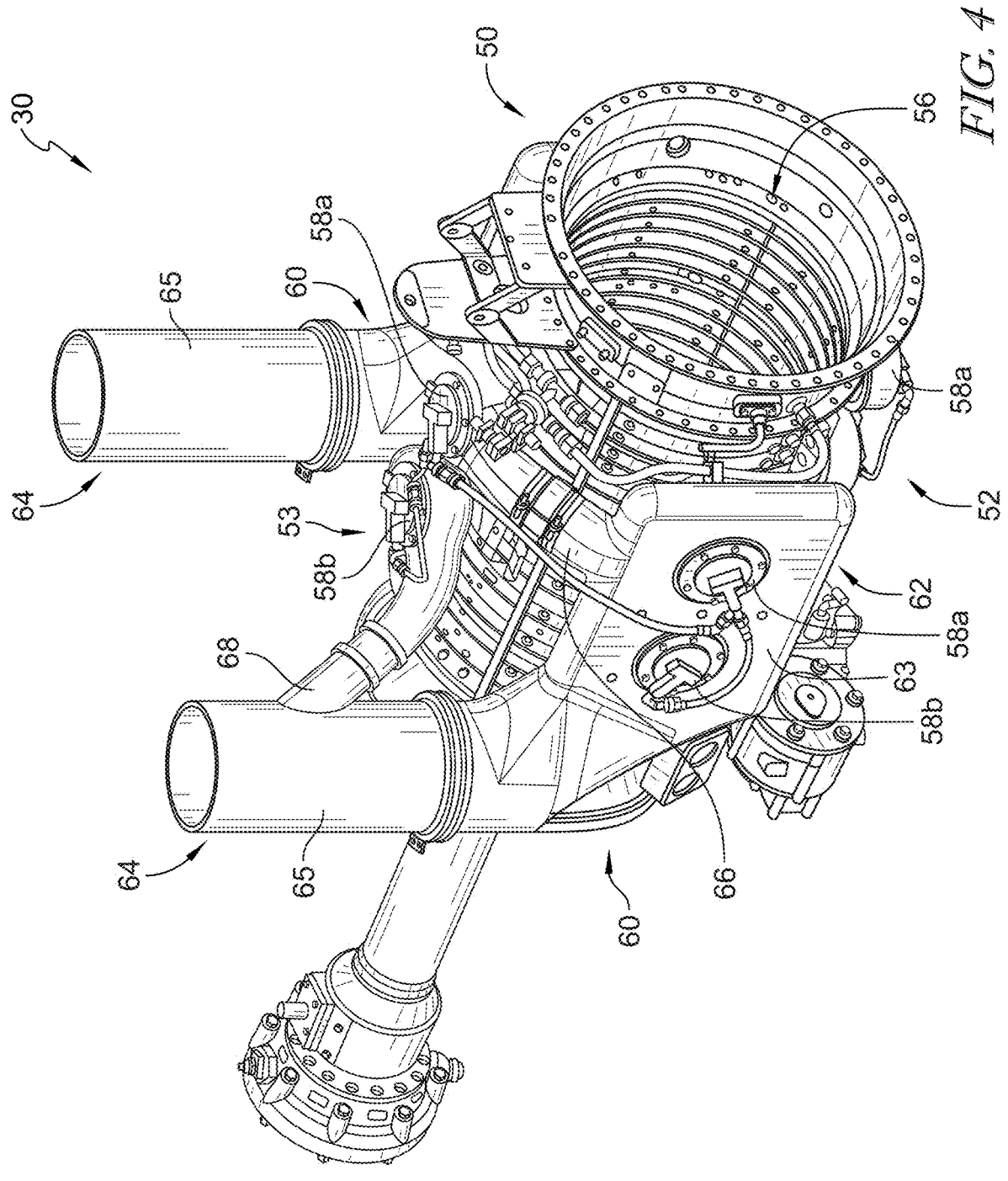
FIG. 4 is a left perspective view of the compressor assembly of FIG. 2, showing that at least one of the bleed-air collectors includes a bypass duct to route bleed air from a bleed-air valve directly into the bleed-air duct, bypassing the bleed-air manifold.

The plurality of bleed-air valves 58 are each fluidly coupled with the outer case 54 of the compressor 50 and the bleed-air collector 60 such that the bleed-air valves 58 control a flow of bleed air from the primary flow path 56 of the compressor 50 into the bleed-air collector 60. Each bleed-air valve 58 is configured to direct air out through the outer case 54, away from the primary flow path 56 of the compressor 50, and into the bleed-air collector 60. The plurality of bleed-air valves 58 may be arranged at different axial and/or circumferential locations of the compressor 50 to bleed air from different areas along the primary flow path 56. As shown in FIGS. 3-4, a portion of the bleed-air valves 58a may be coupled with the outer case 54 at the axial location of the first compressor stage 52 and some bleed-air valves 58b may be coupled to the outer case 54 at the second compressor stage 53. The air bled from axially downstream, high pressure stages 53 of the compressor may have a higher temperature and higher initial pressure coming out of the compressor 50 than air bled from upstream, low pressure stages 52.

The bleed-air collector 60 may include multiple bleed-air manifolds 62 to collect bleed air bled from compressor 50 via the bleed-air valves 58, with each bleed-air manifold 62 coupled to a respective bleed-air duct 64 that receives the collected bleed air from the bleed-air manifold 62 and directs the bleed air out of the enclosure 20. In some embodiments, as shown in FIGS. 3-4, the bleed-air collector 60 may include one or more routing ducts 66 that route bleed-air from the bleed-air valve 58 to the bleed-air manifold 62. In some embodiments, as shown in FIG. 4, at least one of the bleed-air collectors 60 may include a bypass duct 68 that bypasses the bleed-air manifold 62 and routes bleed air directly from the bleed-air valve 58 to the bleed-air duct 64.

In the illustrative embodiment, the compressor assembly 30 includes two bleed-air manifolds 62, each with a respective bleed-air duct 64. In other embodiments, the compressor assembly 30 may include less than two bleed-air manifolds 62 or more than two bleed-air manifolds 62. Each one of the respective bleed-air manifolds 62 may be disposed on a opposite side of the compressor 50, spaced circumferentially apart from each other. For example, as seen in FIGS. 3-4, the compressor assembly 30 may comprise a left bleed-air manifold 62 and a right bleed-air manifold 62, each disposed on an opposite side of the compressor 50. Due to their placement relative to the compressor 50, each manifold 62 may have a different arrangement of bypass 68 and/or routing 66 ducts extending around either a top or bottom of the compressor 50 to route bleed air from the bleed-air valve 58 to a respective bleed-air manifold 62 and/or duct 64. The routing and/or flow path of the bleed air from the valve 58 to a manifold 62 or duct 64 may depend on the placement of the bleed-air valve 58, and may be arranged to provide a smooth transition and flow of the bleed air from the valve 58 to the manifold 62 and/or duct 64.

The bleed-air manifolds 62 may include an outer case 63 defining a chamber within which the bleed air is collected. The bleed-air manifolds 62 may be coupled to the compressor 50 via one or more of the bleed-air valves 58 such that when one of the bleed-air valves 58 actuates, bleed air is bled from the primary flow path 56 of the compressor 50 and flows into the bleed-air manifold 62. A portion of the bleed-air valves 58 may be disposed at the same circumferential location on the compressor as the bleed-air manifold 62 and be directly coupled with the bleed-air manifold 62 such that at least a portion of the bleed-air valve 58 forms at least a portion of the outer case 63 of the bleed-air manifold 62. Each of the bleed-air manifolds 62 may be coupled with at least one of the bleed-air valves 58a in fluid communication with the first compressor stage 52 and with at least one bleed-air valve 58b in fluid communication with the second compressor stage 53.

In the illustrative embodiment, each of the bleed-air manifolds 62 may be substantially rectangular in shape. In other embodiments, the bleed-air manifolds 62 may be any suitable shape to collect the bleed air. In some embodiments, the bleed-air manifolds 62 are different shapes. The bleed-air manifolds 62 may be relatively flat and/or low profile, extending along the axial direction and along the circumferential direction of the compressor 50 a greater length than a width of the bleed-air manifold 62 extends out away from the outer case 54 of the compressor 50 in the radial direction. The bleed-air manifolds 62 may extend in the axial direction along multiple of the compressor stages 52, 53.

The routing ducts 66 may extend circumferentially and/or axially along the outer case 54 of the compressor 50 between the bleed-air manifold 62 and one or more bleed-air valves 58 that are circumferentially spaced apart from the bleed-air manifold 62. For example, at least a portion of the bleed-air valves 58 may not be directly coupled to the bleed-air manifold 62 and/or do not form at least a portion of the case 63 of the bleed-air manifold 62. Instead, some of the bleed-air valves 58 are axially and/or circumferentially spaced apart along the outer case 54 of the compressor 50 from the bleed-air manifold 62. The routing ducts 66 may extend between at least one of the spaced apart bleed-air valve 58 and the bleed-air manifold 62 to direct and/or route the bleed air from the bleed-air valve 58, along the outer case 54, and into the bleed-air manifold 62.

As shown in FIG. 4, one or more of the bleed-air collectors 60 may include one or more bypass ducts 68 that extend between a bleed-air valve 58 and the bleed-air duct 64 to direct bleed air from bleed-air valve 58 directly into bleed-air duct, bypassing the bleed-air manifold 62. A bypass duct 68 may be used, for example, when the flow path from a bleed-air valve 58 into a bleed-air manifold 62 would otherwise require one or more tight turns, or would require that the bleed air pass through geometry that would cause turbulent flow or have a detrimental effect on the flow of the bleed air through the bleed-air collector 60. For example, a bypass duct 68 may be used to avoid an otherwise tortuous path for the air to navigate, which would result in flow separation and large pressure losses.

In the illustrative embodiment, a respective bleed-air duct 64 is coupled to each one of the bleed-air manifolds 62 to receive the collected bleed air and direct the bleed air out of the enclosure 20. Each bleed-air duct 64 is coupled to an end of the bleed-air collector 60 and extends away from the bleed-air collector 60 and the compressor 50 towards the bleed-joint wall 24 of the enclosure 20. An end of the bleed-air duct 64 coupled to the bleed-air manifolds 62 is shaped to funnel the bleed air smoothly from the bleed-air manifold 62 into the bleed-air duct 64. In the illustrative embodiment, a width of the bleed-air manifold 62 may be smaller in dimension than a diameter of the bleed-air duct 64. Accordingly, an end of the bleed-air duct 64 coupled to the bleed-air manifold 62 may be funnel shaped and may narrow in width as it extends from the bleed-air duct 64 towards the bleed-air manifold 62. The enlarged, funnel-like entrance between the bleed-air manifold 62 and the bleed-air duct 64 prevents restriction of the air flow and corresponding pressure losses. This feature, along with the large area of the routing ducts 66 results in the pressure in the bleed-air manifold 62 to be close to ambient during operation. This in turn lowers the stress on the components of the bleed-air collector 60 to more desirable levels.

As shown in FIG. 5, each of the bleed-air ducts 64 includes a first pipe 65 that is coupled to the compressor 50 via the bleed-air manifold 62, and a second pipe 67 coupled to the bleed-joint wall 24 of the enclosure 20. The second pipe 67 is sized such that the second pipe 67 has a larger diameter than the first pipe 65. The first pipe 65 and the second pipe 67 are arranged substantially coaxial with each other during installation and overlap to form the bleed-air duct 64 and extend from the compressor 50 to the enclosure 20, with a portion of the length of the first pipe 65 disposed within the second pipe 67. The first pipe 65 and the second pipe 67 overlap such that they are able to move and/or slide axially relative to one another to prevent a transfer of load from the compressor assembly 30 to the second pipe 67 the enclosure 20.

Figure 9:
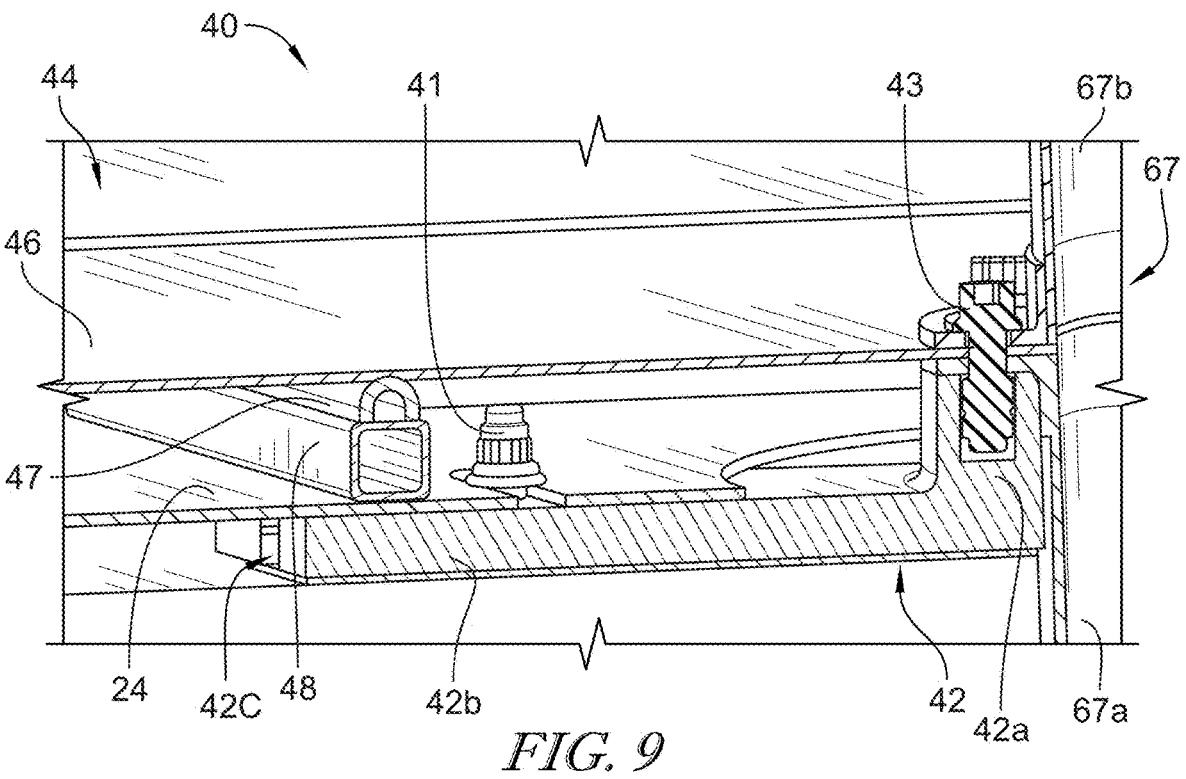
FIG. 9 is section view taken along section line 9-9 of FIG. 7, showing that the attachment bracket is further coupled to the second pipe of the bleed-air duct, and that the fastener extends into both the internal slot of the attachment bracket and the slot in the wall of the enclosure to allow for movement of the second pipe relative to the enclosure in both a fore-to-aft and side-to-side direction, for example, during assembly.

As shown in FIGS. 5 and 9, the second pipe 67 extends through the bleed-joint wall 24 via the aperture 26 defined by the bleed-joint wall 24 to direct the bleed air from the bleed-air collectors 60 via first pipe 65 and out of the enclosure 20 via the second pipe 67. In the illustrative embodiment, the second pipe 67 extends over and overlaps with at least a portion of the first pipe 65 disposed furthest from the compressor 50. As shown in FIG. 9, the second pipe 67 comprises an inner portion 67a and an outer portion 67b that are joined together via one or more fasteners 43. As will be discussed in more detail below, the fastener 43 joins the inner and outer portions 67a, 67b with the bleed-duct joint 40 to couple the second pipe 67 to the enclosure 20.

The inner portion 67a may at least partially overlap with the first pipe 65 and extend away from the compressor 50 and the bleed-air collector 60 towards the bleed-joint wall 24. The inner portion 67a may extend through the aperture 26 in the bleed-joint wall 24 such that one end of the inner portion 67a is inside the enclosure 20 and the opposite end of the inner portion 67a is joined to the outer portion 67b outside of the enclosure 20. The inner portion 67a may include a flange extending around the end of the inner portion 67a coupled to the outer portion 67b. The outer portion 67b extends outwards, away from the bleed-joint wall 24, and away from the enclosure 20. The outer portion 67b may include a flange extending around the end of the outer portion 67b coupled to the inner portion 67a such that the flanges of the outer and inner portions 67b, 67a directly or indirectly abut each other. The fasteners 43 may extend through apertures formed in the flanges to couple the inner and outer portions 67a, 67b together.

The bleed-duct joint 40 couples the second pipe 67 of the bleed-air duct 64 with the enclosure 20 such that the bleed-air duct 64 can move relative to the enclosure 20 to prevent and/or lessen loads from being transferred from the bleed-air duct 64 and/or the compressor assembly 30 to the enclosure 20. The bleed-duct joint 40 is coupled with the second pipe 67 and the wall 24 of the enclosure 20 to locate the second pipe 67 relative to the first pipe 65 so that the first pipe 65 is spaced apart from the second pipe 67 to mechanically decouple the first pipe 65 from the second pipe 67 and allow for thermal growth of the first pipe 65 during operation of the gas turbine engine system 10. In the illustrative embodiment, as shown in FIG. 5, each bleed-air duct 64 is coupled to the enclosure 20 by a respective bleed-duct joint 40. As shown in FIGS. 5-9, the bleed-duct joint 40 includes an attachment bracket 42 that couples the bleed-air duct 64 to the bleed-joint wall 24 and a seal assembly 44 coupled to the bleed-joint wall 24 and the bleed-air duct 64.

The attachment bracket 42 is generally L-shaped and includes a vertical portion 42*a* and a horizontal portion 42*b*. As shown in FIG. 9, the vertical portion 42*a* is adapted to couple to the inner and outer portions 67*a*, 67*b* of the second pipe 67 and extends at least partially through the aperture 26 in the bleed-joint wall 24. The vertical portion 42*a* is shaped to form an aperture through which the fastener 43 extends to couple the attachment bracket 42 to the inner and outer portions 67*a*, 67*b* of the second pipe 67. The attachment bracket 42 may be disposed such that an end of the vertical portion 42*a* abuts the flange of the inner portion 67*a* of the second pipe 67 on an opposite side of the flange than the outer portion 67*b*.

Figure 7:
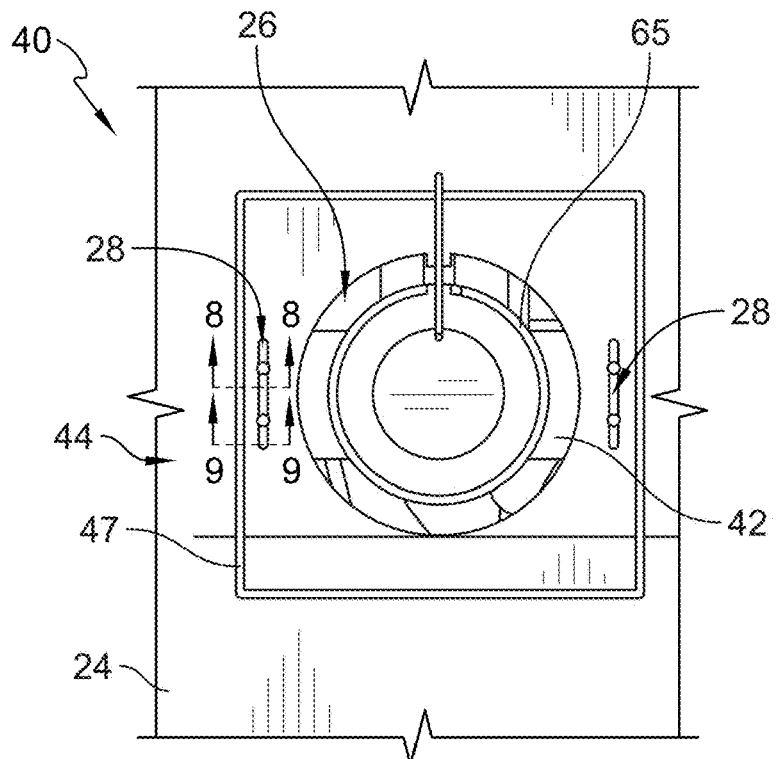
FIG. 7 is a top view of the portion of the bleed-duct joint of FIG. 6 with the rain shield removed, showing that a wall of the enclosure includes an aperture through which the second pipe extends and a slot through which an attachment bracket extends that allows relative movement of the bleed-air duct and the enclosure, for example, during assembly, and showing that the seal assembly includes a seal arranged around the aperture.
Figure 8:
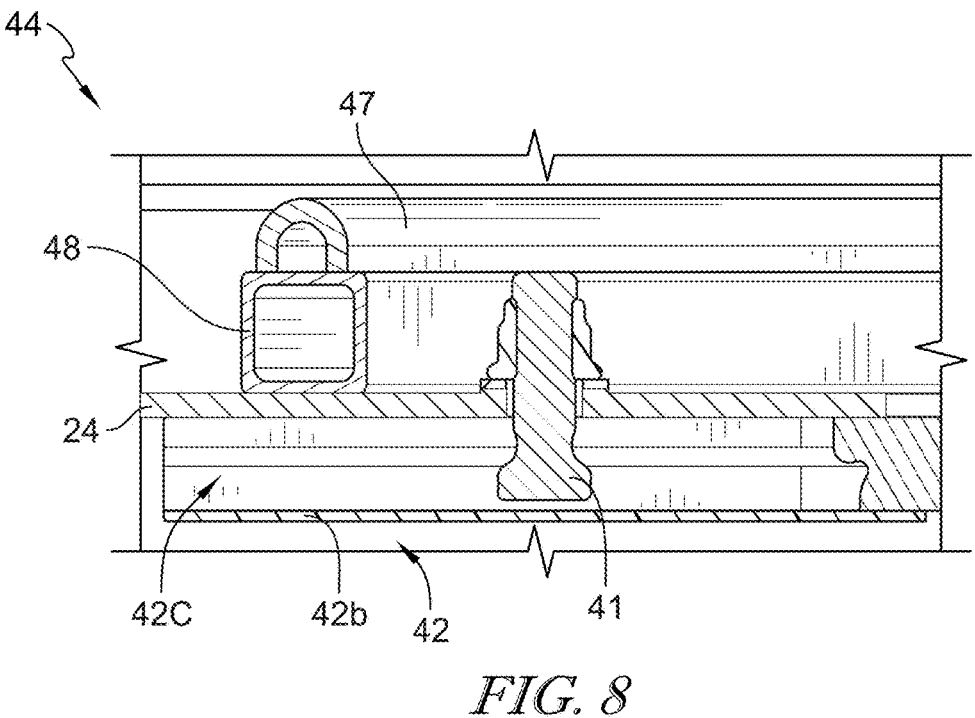
FIG. 8 is a section view taken along section line 8-8 of FIG. 7, perpendicular to a length of the slot, showing that the bleed-duct joint includes an attachment bracket coupled to the wall of the enclosure via a fastener, and showing that the bracket is shaped to form an internal, longitudinal extending slot arranged perpendicular to the slot in the enclosure.

The horizontal portion 42*b* is arranged generally perpendicular to the vertical portion 42*a* and the second pipe 67, and extends along and generally parallel to the bleed-joint wall 24. The horizontal portion 42*b* is arranged to be disposed inside the enclosure 20, closer to the inner portion 67*a* of the second pipe 67 than to the outer portion 67*b*. The horizontal portion 42*b* is shaped to form a longitudinally extending slot 42*c* that extends at least partially along a length of the horizontal portion 42*b* of the attachment bracket 42. The horizontal portion 42*b* is adapted to couple with the bleed-joint wall 24 via a fastener 41 that extends into the longitudinally extending slot 42*c* and through the slot 28 formed in the bleed-joint wall 24. The horizontal portion 42*b* and the longitudinal slot 42*c* of the attachment bracket 42 may be arranged to extend generally perpendicular to the slot 28 in the bleed-joint wall. The arrangement of the fastener 41 extending through both slots 42*c*, 28 to couple the attachment bracket 42 to the bleed-joint wall 24 enables the attachment bracket 42 and the second pipe 67 of the bleed-air ducts 64 to move relative to the enclosure 20 to locate the second pipe 67 relative to the first pipe 65 during installation. The arrangement of the attachment bracket 42, the longitudinal slot 42*c*, the slot 28 in the bleed-joint wall 24, and the fastener 41 enables the second pipe 67 of the bleed-air duct 64 to move and/or slide in the fore-aft and side-to-side directions relative to the enclosure 20, as shown in FIG. 7.

The seal assembly 44 is disposed on an outer surface of the enclosure 20, on an opposite side of the bleed-joint wall 24 from the attachment bracket 42. The seal assembly 44 allows for the duct 64 to move relative to the enclosure 20 while blocking water ingress into the enclosure 20. The seal assembly 44 includes a rain shield 46, a seal 47, and a spacer 48. The spacer 48 is fixedly coupled to an outer surface of the bleed-joint wall 24, opposite the horizontal portion 42*b* of the attachment bracket 42. The spacer 48 forms a perimeter around the slot 28, the aperture 26, and the bleed-air duct 64 such that the slot 28, aperture 26, and bleed-air duct 64 are all disposed within an outer boundary formed by the spacer 48. The spacer 48 projects outward from the bleed-joint wall 24 and is arranged to space the rain shield 46 a distance away from the outer surface of the bleed-joint wall 24 such that the fastener 41 can slide within the slot 28 and not get caught on the rain shield 46. Accordingly, the spacer 48 and/or seal 47 project farther outwards from the outer surface of the bleed-joint wall 24 than the fastener 41.

The rain shield 46 is adapted to fit tightly around the bleed-air duct 64. The rain shield 46 may be arranged to fit between the inner portion 67*a* and the outer portion 67*b* of the second pipe 67 such that the rain shield 46 is sandwiched between the flanges of the inner and outer portion 67*a*, 67*b* to form a fluid tight seal between the rain shield 46 and an outer surface of the bleed-air duct 64. The rain shield 46 is arranged to extend radially outward from the bleed-air duct and past the outer boundary formed by the spacer 48 such that the at least a portion of the rain shield 46 forms an overhang past the spacer 48.

The seal 47 is disposed on an outer surface of the spacer 48, between the spacer 48 and the rain shield 46. The seal 47 may be a rubber, compressible seal, or any other suitable material capable of preventing water ingress. The seal 47 is coupled to the spacer 48. The rain shield 46 rests on the outer portion of the seal 47 opposite the spacer 48 such that the rain shield 46 can slide relative to the seal 47 and the spacer 48 when the bleed-air duct 64 moves relative to the enclosure 20, while still maintaining constant contact with the seal 47 to block water ingress. The seal 47 and the rain shield 46 are arranged to form a fluid tight seal such to block fluid such as wind driven water from entering the enclosure via the aperture 26 or slot 28 in the bleed-joint wall 24. In the illustrative embodiment, the spacer 48, seal 47, and the rain shield 46 are generally square in shape. In other embodiments, they may be any shape suitable to seal off the enclosure 20 from fluid by covering the slot 28 and the gap between an outer circumference of the aperture 26 and the bleed-air duct 64.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine system comprising:

an enclosure having a plurality of walls that cooperate to define a cavity within the enclosure, the plurality of walls including a first wall formed to define an aperture therethrough, a compressor assembly configured to collect compressor bleed air, the compressor assembly including a compressor located within the cavity and configured to compress air received from within the enclosure and a bleed-air collector having a bleed-air manifold configured to receive a portion of the air compressed by the compressor and a bleed-air duct extending through the aperture in the first wall to direct the portion of the air through the aperture formed in the first wall of the enclosure, the bleed-air duct having a first pipe coupled to the compressor for movement with the compressor and a second pipe extending through the aperture in the first wall and arranged around the first pipe, and a bleed-duct joint configured to couple the bleed-air duct with the enclosure, the bleed-duct joint coupled with the second pipe and the first wall of the enclosure to locate the second pipe relative to the first pipe so that the first pipe is spaced apart from the second pipe to mechanically decouple the first pipe from the second pipe and allow for thermal growth of the first pipe during operation of the gas turbine engine system.

2. The gas turbine engine system of claim 1, wherein the bleed-duct joint includes an attachment bracket coupled with the second pipe for movement with the second pipe, the attachment bracket is coupled with the first wall to locate the second pipe relative to the enclosure.

3. The gas turbine engine system of claim 2, wherein the attachment bracket is formed to define a longitudinally extending slot.

4. The gas turbine engine system of claim 3, wherein the first wall is formed to define a slot perpendicular to the longitudinally extending slot.

5. The gas turbine engine system of claim 4, wherein a fastener couples the attachment bracket to the first wall, the fastener extending between the slot in the first wall and the longitudinally extending slot in the attachment bracket.

6. The gas turbine engine system of claim 5, wherein the fastener is arranged to slide within the slot in the first wall and the longitudinally extending slot in the attachment bracket to locate the second pipe.

7. The gas turbine engine system of claim 2, wherein the first wall is formed to define a slot adjacent to the aperture, a fastener coupling the attachment bracket to the first wall arranged to extend through and slide within the slot to locate the second pipe.

8. The gas turbine engine system of claim 2, wherein the bleed-duct joint includes a seal assembly configured to block fluid from entering the compressor through the aperture.

9. The gas turbine engine system of claim 8, wherein the seal assembly includes a rain shield coupled to the second pipe and extending past an outer circumference of the aperture.

10. The gas turbine engine system of claim 9, wherein the seal assembly further includes a seal located between the first wall and the rain shield, the rain shield arranged to contact the seal to block fluid from entering the bleed-duct joint from between the first wall and the rain shield.

11. The gas turbine engine system of claim 10, wherein the seal assembly further includes a spacer coupled with the first wall and arranged around the aperture and the second pipe to form a closed perimeter of the bleed-duct joint.

12. The gas turbine engine system of claim 11, wherein the seal is coupled to the spacer and the rain shield is arranged to rest on top of the seal and the spacer to allow the rain shield to move relative to the first wall.

13. The gas turbine engine system of claim 9, wherein the second pipe includes an outer portion disposed outside of the enclosure and an inner portion coupled to the outer portion and arranged to extend through the aperture towards the compressor.

14. The gas turbine engine system of claim 13, wherein the rain shield is disposed between the inner portion and the outer portion to couple the rain shield to the second pipe and create a seal.

15. A gas turbine engine system comprising:

an enclosure having a plurality of walls that cooperate to define a cavity within the enclosure, the plurality of walls including a first wall formed to define an aperture therethrough, a compressor assembly configured to collect compressor bleed air, the compressor assembly including a compressor located within the cavity and configured to compress air received from within the enclosure and a bleed-air collector configured to receive a portion of the air compressed by the compressor and including a bleed-air duct extending through the aperture in the first wall to direct the portion of the air through the aperture formed in the first wall of the enclosure, the bleed-air duct having a first pipe coupled to the compressor and a second pipe extending through the aperture in the first wall and arranged around the first pipe, and a bleed-duct joint configured to couple the bleed-air duct with the enclosure, the bleed-duct joint coupled with the second pipe and the first wall of the enclosure to locate the second pipe relative to the first pipe so that the first pipe is spaced apart from the second pipe to mechanically decouple the first pipe from the second pipe.

16. The gas turbine engine system of claim 15, wherein the bleed-duct joint includes an attachment bracket coupled with the second pipe for movement with the second pipe, the attachment bracket is coupled with the first wall to locate the second pipe relative to the enclosure.

17. The gas turbine engine system of claim 16, wherein the attachment bracket is formed to define a longitudinally extending slot.

18. The gas turbine engine system of claim 17, wherein the first wall is formed to define a slot perpendicular to the longitudinally extending slot.

19. The gas turbine engine system of claim 18, wherein a fastener couples the attachment bracket to the first wall, the fastener extending between the slot in the first wall and the longitudinally extending slot in the attachment bracket.

* * * * *